United States Patent
Warnes et al.

(10) Patent No.: US 9,778,982 B2
(45) Date of Patent: Oct. 3, 2017

(54) MEMORY ERASURE INFORMATION IN CACHE LINES

(71) Applicant: HEWLETT PACKARD ENTERPRISE DEVELOPMENT LP, Houston, TX (US)

(72) Inventors: Lidia Warnes, Roseville, CA (US); Erin A Handgen, Fort Collins, CO (US); Andrew C. Walton, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/034,651

(22) PCT Filed: Dec. 9, 2013

(86) PCT No.: PCT/US2013/073871
§ 371 (c)(1),
(2) Date: May 5, 2016

(87) PCT Pub. No.: WO2015/088476
PCT Pub. Date: Jun. 18, 2015

(65) Prior Publication Data
US 2016/0274968 A1  Sep. 22, 2016

(51) Int. Cl.
*G06F 11/00* (2006.01)
*G06F 11/10* (2006.01)
(Continued)

(52) U.S. Cl.
CPC ........ *G06F 11/106* (2013.01); *G06F 11/1016* (2013.01); *G06F 11/1666* (2013.01);
(Continued)

(58) Field of Classification Search
CPC ............... G06F 11/106; G06F 11/1016; G06F 12/0811; G06F 12/0893; G06F 12/128
(Continued)

(56) References Cited

U.S. PATENT DOCUMENTS 6,467,048 B1  10/2002  Olarig et al.
6,973,613 B2  12/2005  Cypher
(Continued)

FOREIGN PATENT DOCUMENTS

EP  1000395  5/2000
WO  WO-9304432 A2  3/1993

OTHER PUBLICATIONS

International Searching Authority, The International Search Report and the Written Opinion, Sep. 5, 2014, 9 Pages.
(Continued)

*Primary Examiner* — Christine Tu
(74) *Attorney, Agent, or Firm* — Hewlett Packard Enterprise Patent Department

(57) ABSTRACT

Example implementations relate to storing memory erasure information in memory devices on a memory module. In example implementations, a memory location associated with an error in a first cache line may be identified. The first cache line may include data read from the memory location, and the memory location may be in a first memory device of a plurality of memory devices on a memory module. A device number corresponding to the first memory device may be written to one of the plurality of memory devices. When the memory location is read for a second cache line, the device number corresponding to the first memory device may be retrieved. The second cache line may include the retrieved device number and data read from the memory location.

14 Claims, 11 Drawing Sheets

(51) Int. Cl.
*G06F 11/16* (2006.01)
*G06F 12/0811* (2016.01)
*G06F 12/0831* (2016.01)
*G06F 12/0893* (2016.01)
*G06F 12/128* (2016.01)
G06F 12/0875 (2016.01)
G06F 11/20 (2006.01)

(52) U.S. Cl.
CPC ...... *G06F 12/0811* (2013.01); *G06F 12/0833* (2013.01); *G06F 12/0893* (2013.01); *G06F 12/128* (2013.01); *G06F 11/20* (2013.01); *G06F 12/0875* (2013.01); *G06F 2211/1088* (2013.01); *G06F 2212/1032* (2013.01); *G06F 2212/466* (2013.01); *G06F 2212/60* (2013.01); *G06F 2212/621* (2013.01); *G06F 2212/69* (2013.01)

(58) Field of Classification Search
USPC ....... 714/764, 723, 763, 6.13, 6.12, 6.2, 6.1; 711/202, 205, 206, 207
See application file for complete search history.

(56) References Cited

U.S. PATENT DOCUMENTS

| | | |
|---|---|---|
| 8,065,573 B2 | 11/2011 | Abts et al. |
| 9,158,682 B2* | 10/2015 | Ansaloni ............. G06F 12/0261 |
| 2004/0025094 A1 | 2/2004 | Walker et al. |
| 2007/0050688 A1 | 3/2007 | Thayer |
| 2007/0101094 A1* | 5/2007 | Thayer ................ G06F 12/0804 711/202 |
| 2010/0131812 A1* | 5/2010 | Mohammad ........... G11C 29/44 714/723 |
| 2010/0268984 A1 | 10/2010 | Guthrie et al. |
| 2010/0293305 A1 | 11/2010 | Park et al. |
| 2012/0221902 A1 | 8/2012 | Ware et al. |
| 2012/0254700 A1 | 10/2012 | McGinnis et al. |
| 2012/0311248 A1 | 12/2012 | Goodman |
| 2016/0246724 A1* | 8/2016 | Boehm ................. G06F 11/30 |

OTHER PUBLICATIONS

Kim, J. et al.; "Multi-bit Error Tolerant Caches Using Two-dimensional Error Coding"; Dec. 1-5, 2007; pp. 197-2009.

* cited by examiner

600

| Parity (4 bits) | DRAM # (4 bits) | DRAM # (4 bits) | Data (60 bits) |
|---|---|---|---|
| Parity (4 bits) | | | Data (68 bits) |
| Parity (4 bits) | DRAM # (1 bit) CRC (3 bits) | DRAM # (1 bit) CRC (3 bits) | Data (60 bits) |
| Parity (4 bits) | | | Data (68 bits) |
| Parity (4 bits) | CRC (4 bits) | CRC (4 bits) | Data (60 bits) |
| Parity (4 bits) | | | Data (68 bits) |
| Parity (4 bits) | CRC (4 bits) | CRC (4 bits) | Data (60 bits) |
| Parity (4 bits) | | | Data (68 bits) |
| 1 DRAM | 1 DRAM | 1 DRAM | 15 DRAM |

FIG. 6

MEMORY ERASURE INFORMATION IN CACHE LINES

BACKGROUND

A memory module may include many memory devices. Error correction logic may be used to correct errors detected in the memory devices. Memory modules may include spare memory devices so that when a memory device malfunctions, a spare memory device may be used instead of the malfunctioning memory device.

BRIEF DESCRIPTION OF THE DRAWINGS

The following detailed description references the drawings, wherein:

FIG. 6 is a diagram of an example cache line having device numbers for memory erasure;

DETAILED DESCRIPTION

Figure 1:
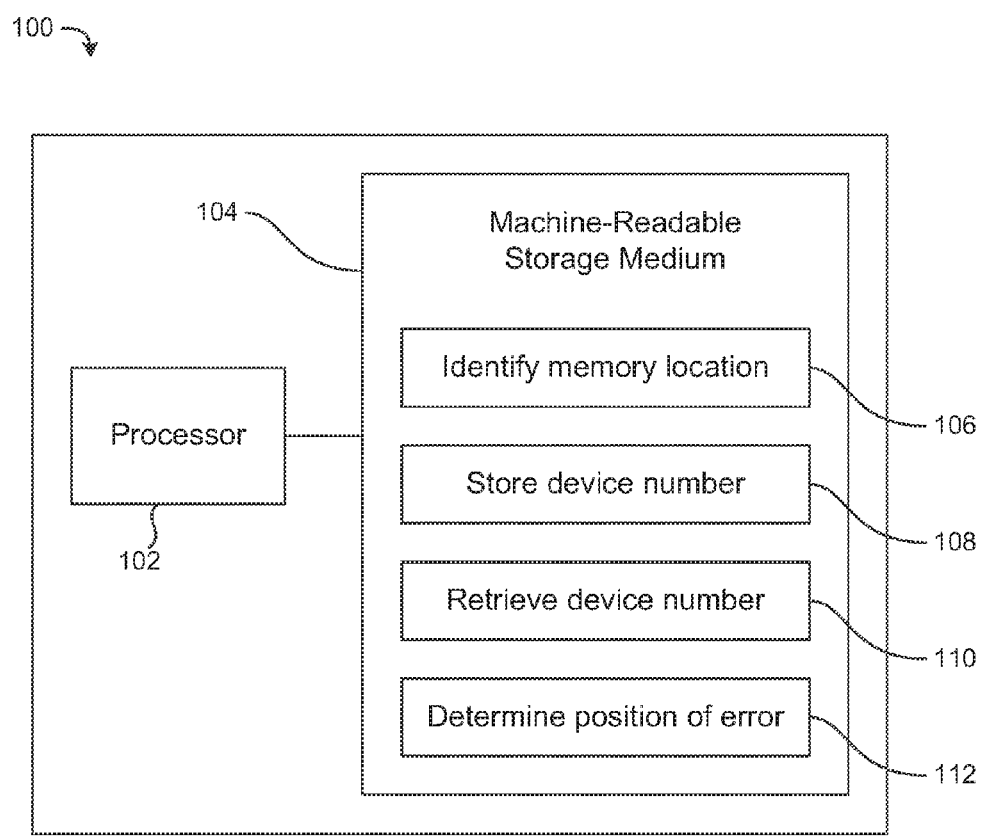
FIG. 1 is a block diagram of an example memory controller that includes a machine-readable storage medium encoded with instructions to store memory erasure information.

Most errors in a memory module do not permeate through an entire memory device. However, even if an error is localized to a small portion (e.g., bit, row, column) of a memory device, the entire memory device may be replaced by a spare memory device. Thus, large error-free portions of a memory device may be unused because of a small error-prone portion of the memory device.

In light of the above, the present disclosure provides for an increase in the granularity at which memory devices may be replaced. A memory controller may be programmed to identify portions of memory devices from which errors originate, to ignore and/or correct data that is read from the identified portions, and to process data from error-free portions of memory devices as usual (e.g., for a single memory device that has an error-prone portion and an error-free portion, data read from the error-prone portion may be ignored/corrected, while data read from the error-free portion may be processed as usual). The process of ignoring and/or correcting data read from a memory device may be referred to herein as "memory erasure". Information regarding which data to ignore/correct may be referred to herein as "memory erasure information".

A memory controller may receive data in a cache line from a memory module. Data may be read from various memory devices of a memory module at substantially the same time, and the memory module may output a cache line that includes the data read from the various memory devices. In some implementations, data may be read from memory devices in bursts, such that multiple addresses in a memory device are read in response to each read command. Each memory device of a memory module may be assigned a device number, and the position of data in a cache line may correspond to the device number of the memory device from which the data was read.

For example, a memory module may include 18 memory devices (e.g., dynamic random-access memories [DRAMs]) numbered 0-17, and a burst length of 8 may be used when reading the memory devices, with each address of a memory device holding 4 bits. Thus, when a read command is sent to such a memory module, the memory module may output a 576-bit cache line (calculated by multiplying 32, which is the number of bits read per memory device, by 18, which is the number of memory devices). In some implementations, the 32 most significant bits of a cache line may be the 32 bits read from memory device 0, the following 32 bits may be the 32 bits read from memory device 1, and so on, with the 32 least significant bits of the cache line being the 32 bits read from memory device 17. In some implementations, the 32 most significant bits of a cache line may be the 32 bits read from memory device 17, the following 32 bits may be the 32 bits read from memory device 16, and so on, with the 32 least significant bits of the cache line being the 32 bits read from memory device 0. It should be understood that other suitable orders of bits may be used, and that other numbering schemes for the device numbers may be used (e.g., the memory devices may be numbered from 1 to 18). Although the present disclosure discusses a memory module having 18 memory devices and a read burst length of 8, it should be understood that the concepts discussed herein are applicable to memory modules having different numbers of memory devices and different burst lengths.

Referring now to the drawings, FIG. 1 is a block diagram of an example memory controller 100 that includes a machine-readable storage medium encoded with instructions to store memory erasure information. Memory controller 100 may be communicatively coupled to, and control access to, various memory devices (e.g., memory devices on a memory module). In FIG. 1, memory controller 100 includes processor 102 and machine-readable storage medium 104. As used herein, the terms "include", "have", and "comprise" are interchangeable and should be understood to have the same meaning.

Processor 102 may include a central processing unit (CPU), microprocessor (e.g., semiconductor-based microprocessor), and/or other hardware device suitable for retrieval and/or execution of instructions stored in machine-readable storage medium 104. Processor 102 may fetch, decode, and/or execute instructions 106, 108, 110, and 112 to enable storage of memory erasure information, as described below. As an alternative or in addition to retrieving and/or executing instructions, processor 102 may include an electronic circuit comprising a number of electronic components for performing the functionality of instructions 106, 108, 110, and/or 112.

Machine-readable storage medium 104 may be any suitable electronic, magnetic, optical, or other physical storage device that contains or stores executable instructions. Thus, machine-readable storage medium 104 may include, for example, a random-access memory (RAM), an Electrically Erasable Programmable Read-Only Memory (EEPROM), a storage device, an optical disc, and the like. In some implementations, machine-readable storage medium 104 may include a non-transitory storage medium, where the term "non-transitory" does not encompass transitory propagating signals. As described in detail below, machine-readable storage medium 104 may be encoded with a set of executable instructions 106, 108, 110, and 112.

Instructions 106 may identify a memory location associated with an error in a first cache line. For example, erroneous data in the first cache line may be detected or identified, and instructions 106 may identify the memory device and/or memory address from which the data was read. The first cache line may include data read from the memory location. The memory location may be in a first memory device of a plurality of memory devices on a memory module. The memory module may be an in-line memory module, such as a single in-line memory module (SIMM) or a dual in-line memory module (DIMM), or any memory module suitable for mounting memory integrated circuits (ICs).

Instructions 108 may store, in one of the plurality of memory devices on the memory module, a device number corresponding to the first memory device. The device number may be in binary form. The device number may be stored in the first memory device or a memory device other than the first memory device. In some implementations, instructions 108 may store, in another one of the plurality of memory devices, the device number corresponding to the first memory device. Such redundant storage of the device number may allow the device number to be retrieved even if one of the memory devices storing the device number fails.

Instructions 110 may retrieve, when the memory location is read for a second cache line, the device number corresponding to the first memory device. The second cache line may include data read from the same memory addresses as those read for the first cache line, but at a later point in time. The second cache line may include the retrieved device number and data read from the memory location identified by instructions 106. In some implementations, instructions 110 may retrieve a first copy of the device number from one of the plurality of memory devices, and retrieve a second copy of the device number from a different one of the plurality of memory devices.

Instructions 112 may determine, based on the device number, a position of an error in the second cache line. As discussed above, the position of data in a cache line may correspond to the device number of the memory device from which the data was read. A device number in a cache line may indicate which group of bits in the cache line memory controller 100 should ignore or correct. For example, if a memory module has memory devices numbered 0-17, and 32 bits are read from each memory device, then if the device number in a cache line is 0, memory controller 100 may ignore or correct the 32 least significant bits in the cache line.

Figure 2:
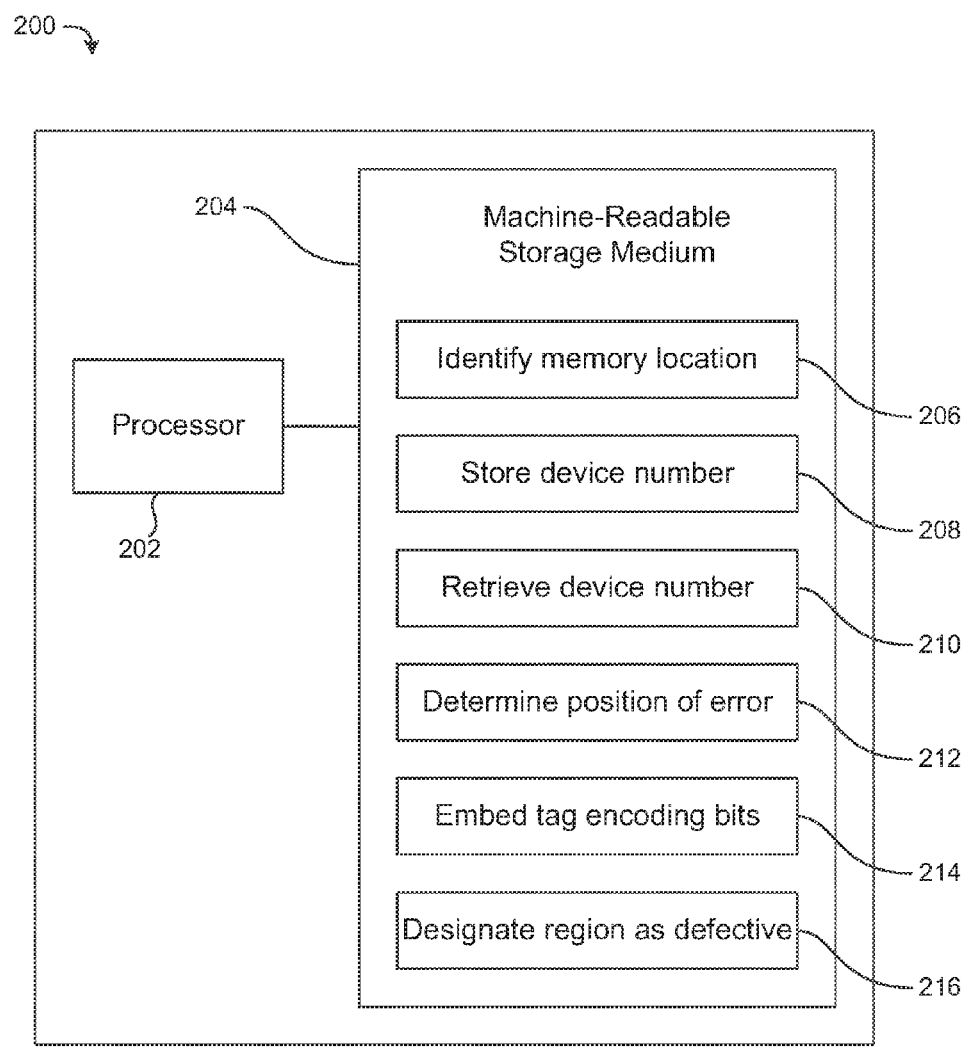
FIG. 2 is a block diagram of an example memory controller that includes a machine-readable storage medium encoded with instructions that enable memory erasure for a region of a memory device.

FIG. 2 is a block diagram of an example memory controller 200 that includes a machine-readable storage medium encoded with instructions that enable memory erasure for a region of a memory device. Memory controller 200 may be communicatively coupled to, and control access to, various memory devices (e.g., memory devices on a memory module). In FIG. 2, memory controller 200 includes processor 202 and machine-readable storage medium 204.

As with processor 102 of FIG. 1, processor 202 may include a CPU, microprocessor (e.g., semiconductor-based microprocessor), and/or other hardware device suitable for retrieval and/or execution of instructions stored in machine-readable storage medium 204. Processor 202 may fetch, decode, and/or execute instructions 206, 208, 210, 212, 214, and 216 to enable memory erasure for a region of a memory device, as described below. As an alternative or in addition to retrieving and/or executing instructions, processor 202 may include an electronic circuit comprising a number of electronic components for performing the functionality of instructions 206, 208, 210, 212, 214, and/or 216.

As with machine-readable storage medium 104 of FIG. 1, machine-readable storage medium 204 may be any suitable physical storage device that stores executable instructions. Instructions 206, 208, 210, and 212 on machine-readable storage medium 204 may be analogous to (e.g., have functions and/or components similar to) instructions 106, 108, 110, and 112 on machine-readable storage medium 104. Instructions 214 may embed tag encoding bits in a stored device number corresponding to a first memory device. Tag encoding bits may be used to indicate ownership of cache lines and maintain cache coherency when multiple processors are used to access the same memory devices. Tag encoding bits may be embedded in stored device numbers when a device number may be discernible using less than all the bits reserved for the device number.

For example, 5 bits may be used to store a device number (in binary form) in a memory module having 18 memory devices numbered 0-17. For device numbers 0-15 (00000 to 01111 in binary form), all 5 bits may be needed to recognize the proper device number. However, for device numbers 16 (10000 in binary form) and 17 (10001 in binary form), the bits that matter are the most significant bit and the least significant bit; the three bits in between may be ignored for purposes of recognizing a device number. Thus, when an error is associated with device number 16 or 17, the third-most significant bit and the fourth-most significant bit of the 5 bits may be tag encoding bits. When an error is associated with device numbers 0-15, no tag encoding bits may be embedded in the device number, and snooping may be used to maintain cache coherency.

When none of the memory locations read for a cache line are associated with an error, the most significant bit and another bit other than the least-significant bit of the 5 bits may both be set to 1. For example, the two most significant bits of the 5 bits may both be set to 1 (e.g., the 5-bit string '11xxx' may be stored when there are no errors in a cache line, where each 'x' may represent either a 0 or a 1). If the most significant bit and any other bit except for the least significant bit of the 5 bits are both 1, it may not matter what the rest of the bits are for purposes of indicating that there are no errors in the cache line. Thus, any of the three remaining bits may be tag encoding bits. For consistency with situations where a memory location read for a cache line is associated with an error, the third-most significant bit and fourth-most significant bit may be tag encoding bits (e.g., the 5-bit string '11ttx' may be stored when there are no errors in a cache line, where each 't' represents a tag encoding bit and the 'x' may represent either a 0 or a 1). Although 5-bit strings for storing device numbers are mentioned herein, it should be understood that the principles and concepts of the present disclosure are applicable for longer or shorter strings for storing device numbers. The number of bits used to store device numbers may be adjusted based on how many memory devices are on a memory module and/or how many tag encoding bits are to be embedded in a device number.

If tag encoding bits are embedded in a device number retrieved by instructions 210, instructions 212 may apply a mask to the device number when using the device number to determine the position of an error in a cache line. For example, if the device number is 5 bits long and the third- and fourth-most significant bits are tag encoding bits, instructions 212 may use a mask to block out the third- and fourth-most significant bits and then determine what the device number is based on the remaining bits.

Instructions 216 may designate a region around a memory location in a first memory device as defective. For example, instructions 216 may designate a row, column, and/or bank that includes a particular memory location as defective. A region may be designated as defective when the number of errors originating from the region exceeds a specified threshold. When an address in the designated region is read, instructions 210 may retrieve a device number corresponding to the first memory device.

Figure 3:
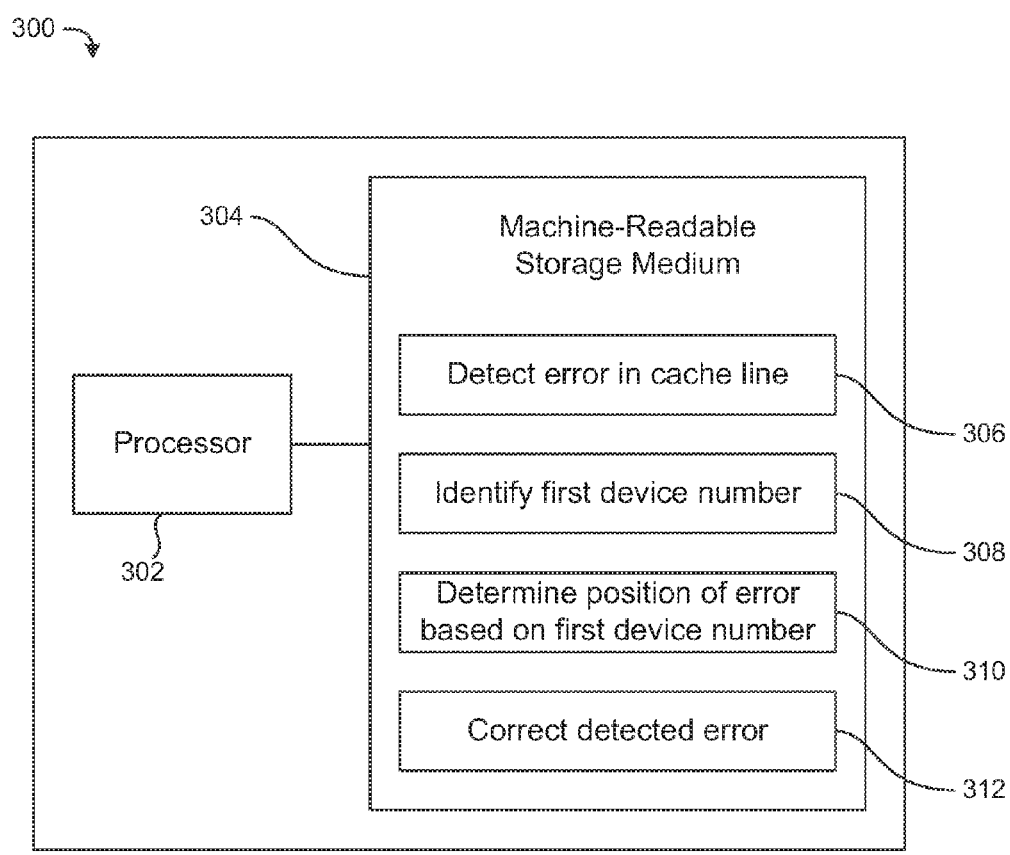
FIG. 3 is a block diagram of an example memory controller that includes a machine-readable storage medium encoded with instructions to correct cache line errors.

FIG. 3 is a block diagram of an example memory controller 300 that includes a machine-readable storage medium encoded with instructions to correct cache line errors. Memory controller 300 may be communicatively coupled to, and control access to, various memory devices (e.g., memory devices on a memory module). In FIG. 3, memory controller 300 includes processor 302 and machine-readable storage medium 304.

As with processor 102 of FIG. 1, processor 302 may include a CPU, microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, 310, and 312 to enable correction of cache line errors, as described below. As an alternative or in addition to retrieving and/or executing instructions, processor 302 may include an electronic circuit comprising a number of electronic components for performing the functionality of instructions 306, 308, 310, and/or 312.

As with machine-readable storage medium 104 of FIG. 1, machine-readable storage medium 304 may be any suitable physical storage device that stores executable instructions. In some implementations, machine-readable storage medium 304 may include a non-transitory storage medium. As described in detail below, machine-readable storage medium 304 may be encoded with a set of executable instructions 306, 308, 310, and 312.

Instructions 306 may detect an error in a cache line. For example, instructions 306 may detect a non-matching checksum computed for a cache line. The detected error may be associated with a first memory device of a plurality of memory devices on a memory module. The memory module may be an in-line memory module, such as a SIMM or DIMM, or any memory module suitable for mounting memory ICs.

Instructions 308 may identify, in a cache line, a first device number. The first device number may correspond to a memory device associated with a detected error (e.g., data read from the memory device may contain the detected error), and may be read from one of a plurality of memory devices on a memory module. The first device number may appear in a designated position in a cache line. For example, a device number may be 5 bits, and any cache line that contains a device number may have the device number in the 5 most significant bits of the cache line. The 5 bits of a device number may appear consecutively in a cache line, or may be split up into different parts of a cache line.

In some implementations, tag encoding bits may be embedded in the first device number, as discussed above with respect to FIG. 2. In such implementations, instructions 308 may apply a mask to the first device number to block out the tag encoding bits. For example, if the device number is 5 bits long and the third- and fourth-most significant bits are tag encoding bits, instructions 308 may use a mask to block out the third- and fourth-most significant bits and then determine what device number is specified by the remaining bits.

Instructions 310 may determine, based on a first device number, a position of a detected error in a cache line. As discussed above, the position of data in a cache line may correspond to the device number of the memory device from which the data was read. Instructions 310 may identify the position, in the cache line, that corresponds to the first device number. For example, if 32 bits are read from each memory device of a memory module and the bits read from memory device 0 are the 32 least significant bits of a cache line, then if the cache line includes the device number 00000, instructions 310 may determine that a detected error is in the last 32 bits of the cache line.

Instructions 312 may correct a detected error in a cache line. In some implementations, instructions 312 may use non-erroneous data in a cache line to reconstruct data for a portion of the cache line having the detected error. The portion of the cache line having the detected error may include data read from a memory device corresponding to a device number identified in the cache line. In some implementations, instructions 312 may ignore the data in a certain position of a cache line (e.g., the portion of the cache line that includes data read from the memory device corresponding to a device number in the cache line) and use data in other positions in the cache line to determine what data should be in the ignored position.

Figure 4:
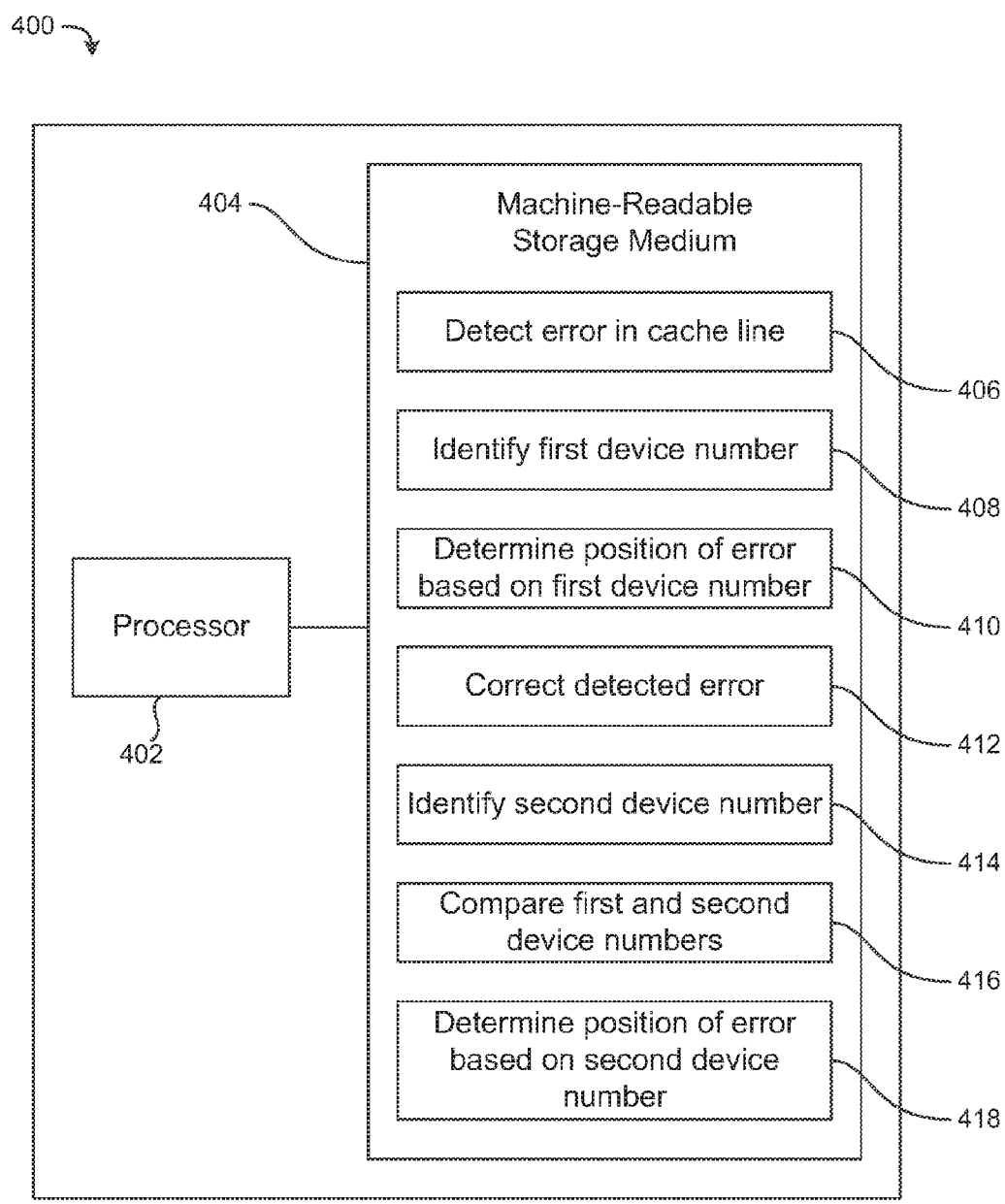
FIG. 4 is a block diagram of an example memory controller that includes a machine-readable storage medium encoded with instructions to identify and use device numbers in a cache line for memory erasure.

FIG. 4 is a block diagram of an example memory controller 400 that includes a machine-readable storage medium encoded with instructions to identify and use device numbers in a cache line for memory erasure. Memory controller 400 may be communicatively coupled to, and control access to, various memory devices (e.g., memory devices on a memory module). In FIG. 4, memory controller 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, 414, 416, and 418 to enable memory erasure for a region of a memory device, as described below. As an alternative or in addition to retrieving and/or executing instructions, processor 402 may include an electronic circuit comprising a number of electronic components for performing the functionality of instructions 406, 408, 410, 412, 414, 416, and/or 418.

As with machine-readable storage medium 304 of FIG. 3, machine-readable storage medium 404 may be any suitable physical storage device that stores executable instructions. Instructions 406, 408, 410, and 412 on machine-readable storage medium 404 may be analogous to instructions 306, 308, 310, and 312 on machine-readable storage medium 304. Instructions 408 may identify a first device number in a cache line, and the first device number may be read from one of a plurality of memory devices on a memory module. Instructions 414 may identify a second device number in the cache line. The second device number may be read from another one of the plurality of memory devices. The second device number may correspond to a memory device associated with an error detected by instructions 406, and may be a copy of the first device number. In some implementations, tag encoding bits may be embedded in the second device number, and instructions 414 may use a mask when identifying the second device number, in a manner analogous to that discussed above with respect to FIG. 3.

The second device number may appear in a designated position in a cache line. For example, a device number may be 5 bits, and any cache line that contains two device numbers may have the second device number in the 5 least significant bits of the cache line. The 5 bits of the second device number may appear consecutively in a cache line, or may be split up into different parts of a cache line.

Instructions 416 may compare the first device number identified by instructions 408 and the second device number identified by instructions 414. For example, instructions 416 may input the first device number and the second device number into a comparator. If the first device number and the second device number match, the device number may be used to determine the position of an error in a cache line detected by instructions 406, and the error may be corrected. If the first device number and the second device number do not match, an attempt may be made to use the first device number to determine the position of an error in a cache line and to correct the error.

Instructions 418 may determine, based on the second device number, the position of a detected error in the cache line. Instructions 418 may be executed if the first device number and the second device number do not match, and if the detected error is not successfully corrected when the first device number is used to determine the position of the detected error. As discussed above, the position of data in a cache line may correspond to the device number of the memory device from which the data was read. Instructions 418 may identify the position, in the cache line, that corresponds to the second device number. For example, if 32 bits are read from each memory device of a memory module and the bits read from memory device 0 are the 32 least significant bits of a cache line, then if the second device number is 00000, instructions 418 may determine that a detected error is in the last 32 bits of the cache line. Instructions 412 may correct the error in the determined position of the cache line.

Figure 5:
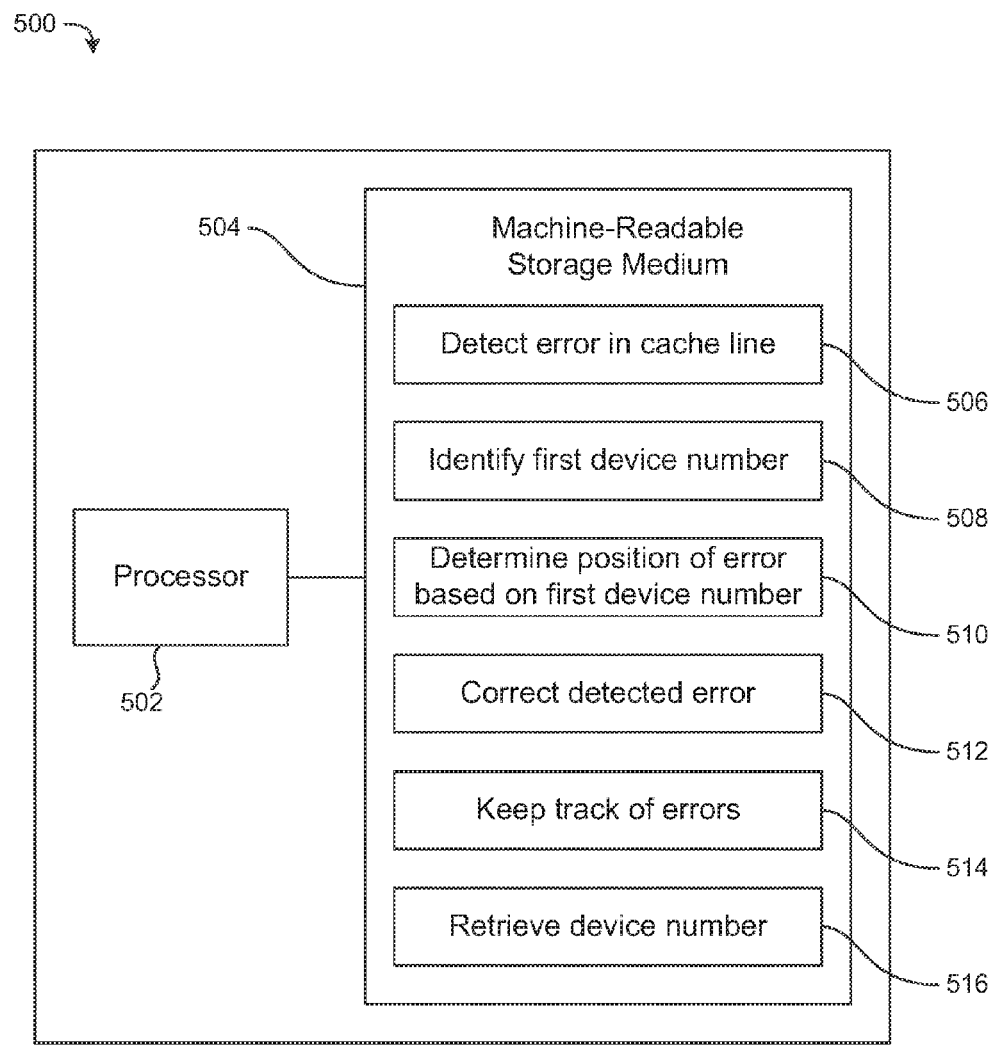
FIG. 5 is a block diagram of an example memory controller that includes a machine-readable storage medium encoded with instructions to track errors in a memory device.

FIG. 5 is a block diagram of an example memory controller 500 that includes a machine-readable storage medium encoded with instructions to track errors in a memory device. Memory controller 500 may be communicatively coupled to, and control access to, various memory devices (e.g., memory devices on a memory module). In FIG. 5, memory controller 500 includes processor 502 and machine-readable storage medium 504.

As with processor 302 of FIG. 3, processor 502 may include a CPU, microprocessor (e.g., semiconductor-based microprocessor), and/or other hardware device suitable for retrieval and/or execution of instructions stored in machine-readable storage medium 504. Processor 502 may fetch, decode, and/or execute instructions 506, 508, 510, 512, 514, and 516 to enable tracking of errors in a memory device, as described below. As an alternative or in addition to retrieving and/or executing instructions, processor 502 may include an electronic circuit comprising a number of electronic components for performing the functionality of instructions 506, 508, 510, 512, 514, and/or 516.

As with machine-readable storage medium 304 of FIG. 3, machine-readable storage medium 504 may be any suitable physical storage device that stores executable instructions. Instructions 506, 508, 510, and 512 on machine-readable storage medium 504 may be analogous to instructions 306, 308, 310, and 312 on machine-readable storage medium 304. Instructions 514 may keep track of how many errors are associated with a region of a first memory device on a memory module. The memory module may be an in-line memory module, such as a SIMM or DIMM, or any memory module suitable for mounting memory ICs. The region of the first memory device may be a row or column of the first memory device. In some implementations, instructions 514 may keep track of how many errors are associated with a memory bank that includes part of the first memory device.

In some implementations, instructions 514 may maintain an error counter that is incremented whenever an error associated with the region (e.g., an error in data read from an address in the region) is detected. If the number of errors associated with the region exceeds a specified threshold value, the region may be designated as defective. Data read from an address in a region designated as defective may be deemed unreliable.

Instructions 516 may retrieve, when an address in the region is read, a device number corresponding to the first memory device. Instructions 516 may be executed if the region is designated as defective. The device number may be retrieved from one of a plurality of memory devices on the memory module. In some implementations, instructions 516 may retrieve a copy of the device number from another one of the plurality of memory devices, such that the device number appears twice in a cache line. If one of the memory devices from which the device number is retrieved fails, an accurate copy of the device number may still appear in a cache line and be used for memory erasure.

In some implementations, a patrol scrubber may be used to program memory devices in the memory module such that whenever an address in a defective region is read, the device number corresponding to the memory device containing the defective region is also retrieved. Thus, both the data read from the defective region and the corresponding device number may appear in the same cache line. Instructions 510 may use the device number to determine where in the cache line the data read from the defective region is so that the data can be ignored or corrected.

FIG. 6 is a diagram of an example cache line 600 having device numbers for memory erasure. Cache line 600 may be output by a memory module having 18 DRAMs. A burst length of 8 may be used when reading the DRAMs, as illustrated by the 8 rows in FIG. 6. Each DRAM address may hold 4 bits. Thus, cache line 600 may have 576 bits (calculated by multiplying 32, which is the number of bits read per DRAM, by 18, which is the number of DRAMs).

The left-most column in FIG. 6 represents data read for cache line 600 from a first DRAM of the memory module. The second column from the left in FIG. 6 represents data read for cache line 600 from a second DRAM of the memory module. The third column from the left in FIG. 6 represents data read for cache line 600 from a third DRAM of the memory module. The right-most column in FIG. 6, which is wider than the other three columns, represents data read for cache line 600 from the remaining 15 DRAMs of the memory module.

The first DRAM may store parity bits. Cache line 600 includes 32 parity bits, which may enable detection of 100% of errors in cache line 600. The second and third DRAMs may store device numbers (represented by "DRAM #" in FIG. 6), cyclic redundancy check (CRC) bits, and other data. Cache line 600 includes 10 device number bits. The 10 bits may be two copies of the same 5-bit device number. In some implementations, the device numbers may include embedded tag encoding bits (e.g., 2 tag encoding bits per device number, 4 tag encoding bits total in cache line 600), as discussed above with respect to FIG. 2. Cache line 600 includes 22 CRC bits, which may enable 99.999976% of errors in cache line 600 to be corrected. The remaining 15 DRAMs may store data other than parity bits, device numbers, and CRC bits.

Figure 7:
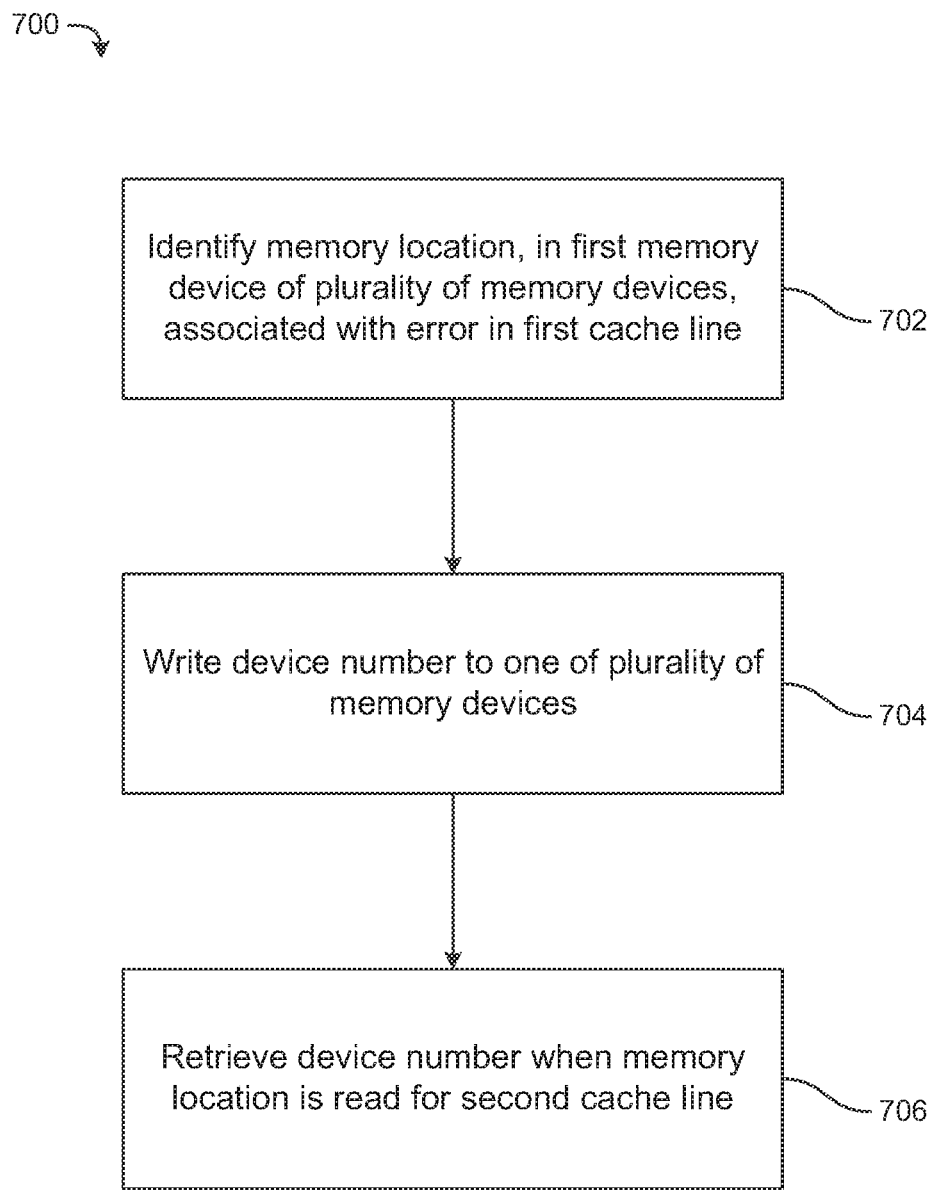
FIG. 7 is a flowchart of an example method for storing memory erasure information.

Methods related to memory erasure are discussed with respect to FIGS. 7-11. FIG. 7 is a flowchart of an example method 700 for storing memory erasure information. Although execution of method 700 is described below with reference to processor 102 of FIG. 1, it should be understood that execution of method 700 may be performed by other suitable devices, such as processors 202 and 302 of FIGS. 2 and 3, respectively. Method 700 may be implemented in the form of executable instructions stored on a machine-readable storage medium and/or in the form of electronic circuitry.

Method 700 may start in block 702, where processor 102 may identify a memory location, in a first memory device of a plurality of memory devices on a memory module, associated with an error in a first cache line. For example, processor 102 may detect or identify erroneous data in the first cache line, and identify the memory device and/or memory address from which the data was read. The memory module may be an in-line memory module, such as a SIMM or DIMM, or any memory module suitable for mounting memory ICs. The first cache line may include data read from the memory location.

Next, in block 704, processor 102 may write a device number to one of the plurality of memory devices. The device number may correspond to the first memory device, and may be in binary form. The device number may be stored in the first memory device or a memory device other than the first memory device. In some implementations, 5 bits may be used to store the device number. In some implementations, tag encoding bits may be embedded in the device number. The number of bits used to store the device number may be adjusted based on how many memory devices are on the memory module and/or how many tag encoding bits are to be embedded in a device number.

Finally, in block 706, processor 102 may retrieve the device number written in block 704 when the memory location identified in block 702 is read for a second cache line. The second cache line may include the retrieved device number and data read from the memory location. The second cache line may include data read from the same memory addresses as those read for the first cache line, but at a later point in time. The device number retrieved in block 706 may be used to correct an error in the second cache line, as discussed above with respect to FIG. 3.

Figure 8:
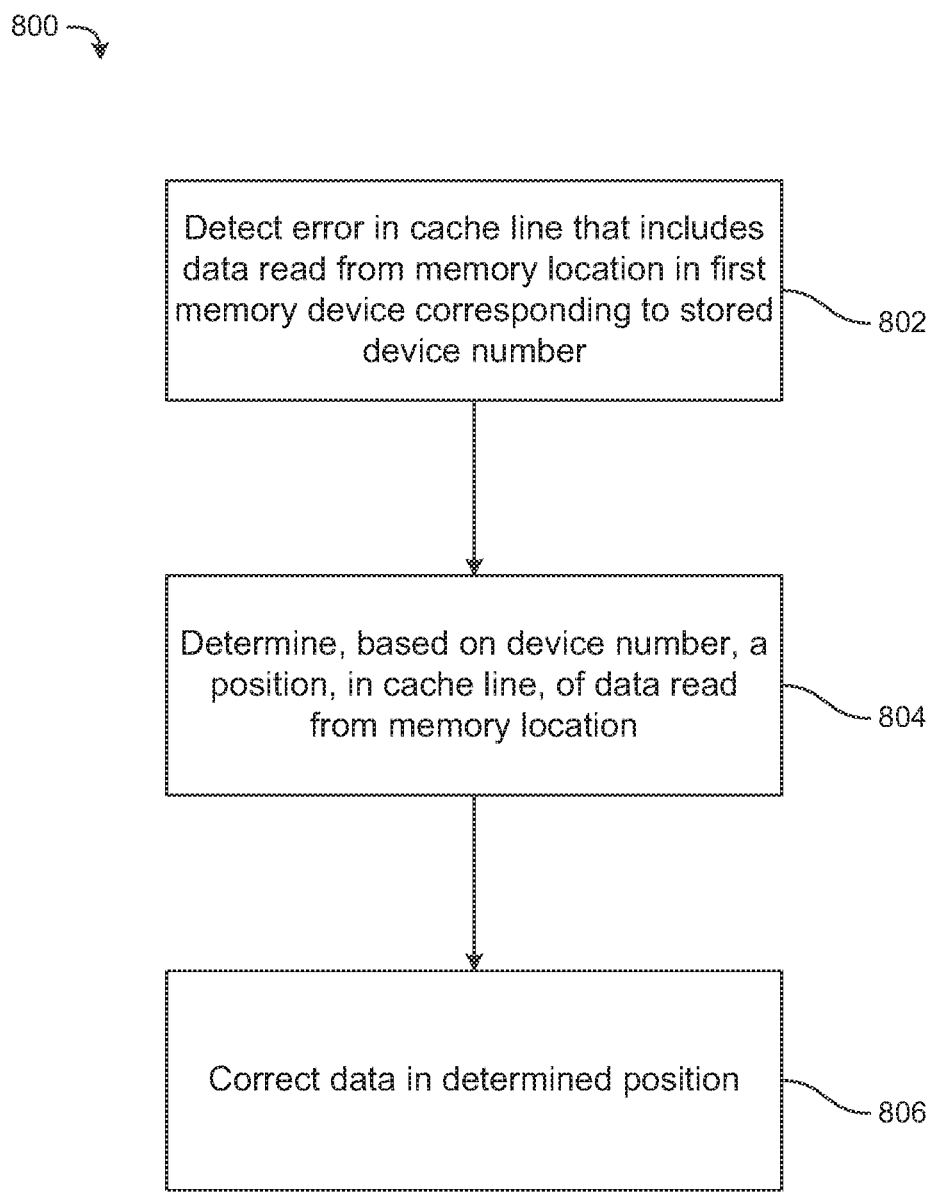
FIG. 8 is a flowchart of an example method for correcting a cache line error.

FIG. 8 is a flowchart of an example method 800 for correcting a cache line error. Although execution of method 800 is described below with reference to processor 302 of FIG. 3, it should be understood that execution of method 800 may be performed by other suitable devices, such as processors 402 and 502 of FIGS. 4 and 5, respectively. In some implementations, some blocks of method 800 may be performed in parallel with and/or after method 700. Method 800 may be implemented in the form of executable instructions stored on a machine-readable storage medium and/or in the form of electronic circuitry.

Method 800 may start in block 802, where processor 302 may detect an error in a cache line that includes data read from a memory location in a first memory device corresponding to a stored device number. For example, processor 302 may detect a non-matching checksum computed for the cache line. The first memory device may be one of a plurality of memory devices on a memory module, and the detected error may be associated with the first memory device (e.g., data read from the first memory device for the cache line may contain errors). The memory module may be an in-line memory module, such as a SIMM or DIMM, or any memory module suitable for mounting memory ICs. Along with data read from the first memory device, the cache line may also include the device number corresponding to the first memory device.

Next, in block 804, processor 302 may determine, based on the device number, a position, in the cache line, of data read from the memory location. As discussed above, the position of data in a cache line may correspond to the device number of the memory device from which the data was read. Processor 302 may identify the position, in the cache line, that corresponds to the device number in the cache line. For example, if 32 bits are read from each memory device of the memory module and the bits read from memory device 0 are the 32 least significant bits of the cache line, then if the cache line includes the device number 00000, processor 302 may determine that the error detected in block 802 is in the last 32 bits of the cache line.

In some implementations, tag encoding bits may be embedded in the device number, as discussed above with respect to FIG. 2. In such implementations, processor 302 may apply a mask to the device number to block out the tag encoding bits. For example, if the device number is 5 bits long and the third- and fourth-most significant bits are tag encoding bits, processor 302 may use a mask to block out the third- and fourth-most significant bits and then determine what device number is specified by the remaining bits.

Finally, in block 806, processor 302 may correct the data in the determined position. In some implementations, processor 302 may use non-erroneous data in the cache line to reconstruct data for a portion of the cache line having the detected error. In some implementations, processor 302 may ignore the data in the determined position of the cache line (e.g., the portion of the cache line that includes data read from the memory device corresponding to the device number in the cache line) and use data in other positions in the cache line to determine what data should be in the determined position.

Figure 9:
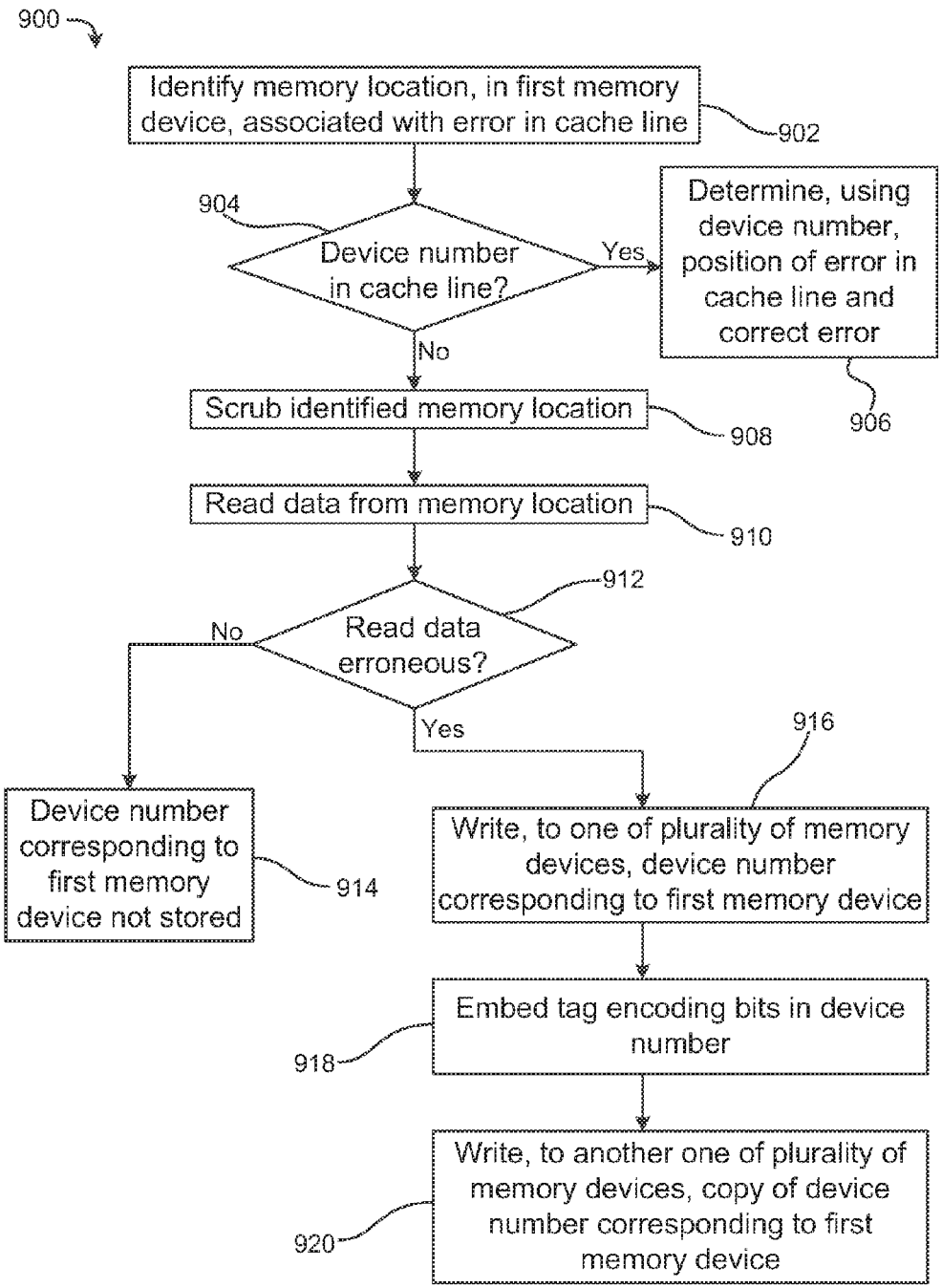
FIG. 9 is a flowchart of an example method for storing device numbers to enable memory erasure on a cache line basis.

FIG. 9 is a flowchart of an example method 900 for storing device numbers to enable memory erasure on a cache line basis. Although execution of method 900 is described below with reference to processor 302 of FIG. 3, it should be understood that execution of method 900 may be performed by other suitable devices, such as processors 402 and 502 of FIGS. 4 and 5, respectively. In some implementations, some blocks of method 900 may be performed in parallel with and/or after method 700. Method 900 may be implemented in the form of executable instructions stored on a machine-readable storage medium and/or in the form of electronic circuitry.

Method 900 may start in block 902, where processor 302 may identify a memory location, in a first memory device of a plurality of memory devices on a memory module, associated with an error in a cache line. For example, processor 302 may detect or identify erroneous data in the cache line, and identify the memory address from which the data was read. The cache line may include data read from the memory location. The memory module may be an in-line memory module, such as a SIMM or DIMM, or any memory module suitable for mounting memory ICs.

Next, in block 904, processor 302 may determine whether there is a device number in the cache line. For example, processor 302 may determine whether a device number appears in a designated position in the cache line, as discussed above with respect to FIG. 3. If processor 302 determines that there is a device number in the cache line, method 900 may proceed to block 906, in which processor 302 may determine, using the device number, the position of the error in the cache line and correct the error, as discussed above with respect to FIG. 8.

If, in block 904, it is determined that there is not a device number in the cache line (e.g., if there is not a valid device number in the designated position in the cache line), method 900 may proceed to block 908, in which processor 302 may scrub the identified memory location in the first memory device (e.g., write correct data to the identified memory location). Next, in block 910, processor 302 may read data from the scrubbed memory location.

In block 912, processor 302 may determine whether the data read from the memory location is erroneous. For example, processor 302 may run a checksum algorithm on the data. If the data is not erroneous, method 900 may proceed to block 914, and the device number corresponding to the first memory device may not be stored.

If, in block 912, it is determined that the data read from the memory location is erroneous, method 900 may proceed to block 916, in which processor 302 may write, to one of the plurality of memory devices, a device number corresponding to the first memory device. The device number may be in binary form (e.g., 5 bits). The device number may be written to the first memory device or to a memory device other than the first memory device.

In block 918, processor 302 may embed tag encoding bits in the device number. For example, the device number may be stored in a 5-bit string, and two of the five bits may be tag encoding bits, as discussed above with respect to FIG. 2. It should be understood that block 918 may not be performed in implementations where snooping is used to maintain cache coherency.

In block 920, processor 302 may write, to another one of the plurality of memory devices, a copy of the device number corresponding to the first memory device. The copy of the device number may include embedded tag encoding bits. Such redundant storage of the device number may allow the device number to be retrieved even if one of the memory devices to which the device number is written fails.

Figure 10:
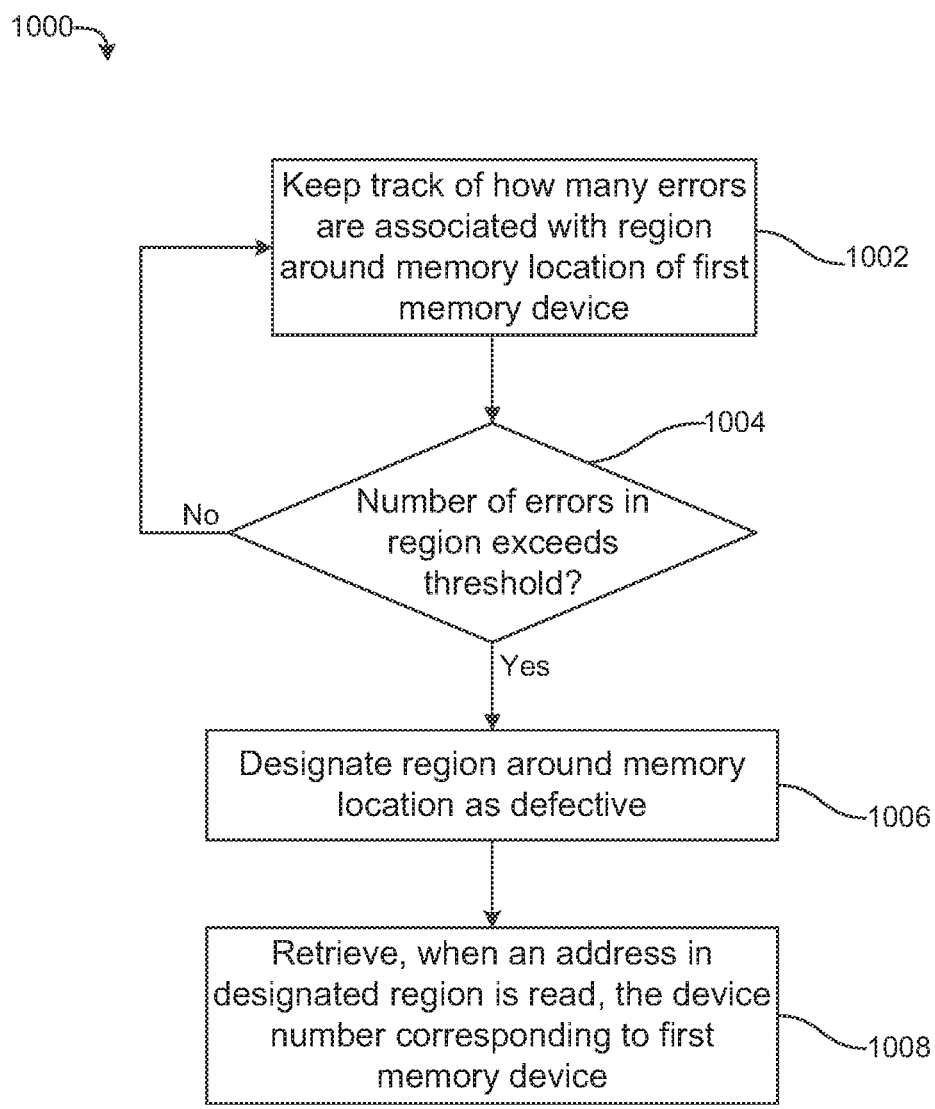
FIG. 10 is a flowchart of an example method for memory erasure for a region of a memory device.

FIG. 10 is a flowchart of an example method 1000 for memory erasure for a region of a memory device. Although execution of method 1000 is described below with reference to processor 502 of FIG. 5, it should be understood that execution of method 1000 may be performed by other suitable devices, such as processor 202 of FIG. 2. In some implementations, some blocks of method 1000 may be performed in parallel with and/or after method 700. Method 1000 may be implemented in the form of executable instructions stored on a machine-readable storage medium and/or in the form of electronic circuitry.

Method 1000 may start in block 1002, where processor 502 may keep track of how many errors are associated with a region around a memory location of a first memory device. The region may be a row, column, and/or memory bank that includes the memory location. In some implementations, processor 502 may maintain an error counter that is incremented whenever an error associated with the region (e.g., an error in data read from an address in the region) is detected.

In block 1004, processor 502 may determine whether the number of errors in the region exceeds a threshold number of errors. For example, processor 502 may input the value of the error counter and the threshold number into a comparator. If the number of errors in the region does not exceed the threshold number, method 1000 may loop back to block 1002.

If, in block 1004, it is determined that the number of errors in the region exceeds the threshold number of errors, method 1000 may proceed to block 1006, in which processor 502 may designate the region around the memory location as defective. In some implementations, method 1000 may proceed to block 1006 if the number of errors in the region equals the threshold number of errors. Data read from an address in a region designated as defective may be deemed unreliable.

Finally, in block 1008, processor 502 may retrieve, when an address in the designated region is read, the device number corresponding to the first memory device. Processor 502 may retrieve the device number from one of a plurality of memory devices on a memory module. In some implementations, processor 502 may retrieve a copy of the device number from another one of the plurality of memory devices, such that the device number appears twice in a cache line. If one of the memory devices from which the device number is retrieved fails, an accurate copy of the device number may still appear in a cache line and be used for memory erasure.

Figure 11:
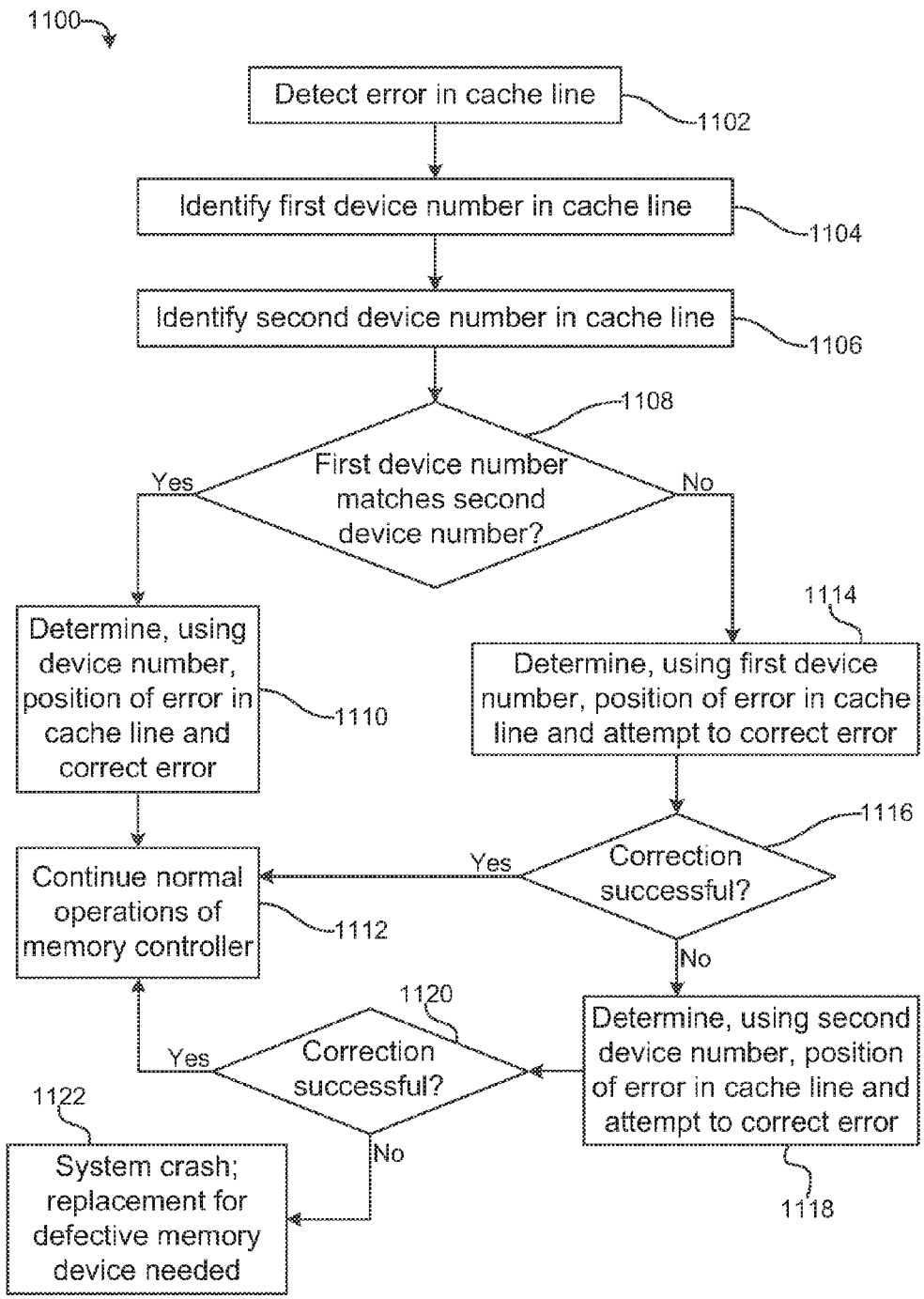
FIG. 11 is a flowchart of an example method for identifying and using device numbers in a cache line for memory erasure.

FIG. 11 is a flowchart of an example method 1100 for identifying and using device numbers in a cache line for memory erasure. Although execution of method 1100 is described below with reference to processor 402 of FIG. 4, it should be understood that execution of method 1100 may be performed by other suitable devices, such as processors 102 and 302 of FIGS. 1 and 3, respectively. In some implementations, some blocks of method 1100 may be performed in parallel with and/or after method 800. Method 1100 may be implemented in the form of executable instructions stored on a machine-readable storage medium and/or in the form of electronic circuitry.

Method 1100 may start in block 1102, where processor 402 may detect an error in a cache line. For example, processor 402 may detect a non-matching checksum computed for the cache line. The detected error may be associated with a memory location in a memory device on a memory module. The memory module may have a plurality of memory devices, and may be an in-line memory module, such as a SIMM or DIMM, or any memory module suitable for mounting memory ICs.

Next, in block 1104, processor 402 may identify a first device number in the cache line. The first device number may correspond to a memory device associated with the detected error (e.g., data read from the memory device may contain the detected error), and may be read from one of a plurality of memory devices on a memory module. The first device number may appear in a designated position in the cache line, as discussed above with respect to FIG. 3. In some implementations, tag encoding bits may be embedded in the first device number, and processor 402 may use a mask when identifying the first device number, as discussed above with respect to FIG. 3.

In block 1106, processor 402 may identify a second device number in the cache line. The second device number may be read from another one of the plurality of memory devices. The second device number may correspond to a memory device associated with the detected error, and may be a copy of the first device number. The second device number may appear in a designated position in the cache line, as discussed above with respect to FIG. 4. In some implementations, tag encoding bits may be embedded in the second device number, and processor 402 may use a mask when identifying the second device number, in a manner analogous to that discussed above with respect to FIG. 3.

Next, in block 1108, processor 402 may determine whether the first device number matches the second device number. For example, processor 402 may input the first device number and the second device number into a comparator. If the first device number and the second device number match, method 1100 may proceed to block 1110, in which processor 402 may determine, using the device number, the position of the error in the cache line and correct the error, as discussed above with respect to FIG. 8. In block 1112, processor 402 may continue normal operations of memory controller 400.

If, in block 1108, it is determined that the first device number does not match the second device number, method 1100 may proceed to block 1114, in which processor 402 may use the first device number to determine the position of the error in the cache line and attempt to correct the error. As discussed above, the position of data in a cache line may correspond to the device number of the memory device from which the data was read. In block 1114, processor 402 may determine which bits in the cache line are in the position corresponding to the first device number, and may attempt to correct those bits (e.g., reconstruct the data in the position using data in other positions in the cache line).

Next, in block 1116, processor 402 may determine whether the correction attempted in block 1114 was successful. For example, processor 402 may run a checksum algorithm on the corrected bits and/or the entire cache line with the corrected bits. If it is determined that the correction was successful, method 1100 may proceed to block 1112.

If, in block 1116, it is determined that the attempted correction was not successful, method 1100 may proceed to block 1118, in which processor 402 may use the second device number to determine the position of the error in the cache line and attempt to correct the error. For example, processor 402 may determine which bits in the cache line are in the position corresponding to the second device number, and may attempt to correct those bits (e.g., reconstruct the data in the position using data in other positions in the cache line). Next, in block 1120, processor 402 may determine whether the correction attempted in block 1118 was successful. For example, processor 402 may run a checksum algorithm on the corrected bits and/or the entire cache line with the corrected bits. If it is determined that the correction was successful, method 1100 may proceed to block 1112.

If, in block 1120, it is determined that the correction attempted in block 1118 was not successful, method 1100 may proceed to block 1122, in which a system crash may occur due to the uncorrected error. The defective memory device associated with the error may need to be replaced for memory controller 400 to operate normally.

The foregoing disclosure describes inclusion of memory erasure information for a cache line in the cache line. Such memory erasure information in a cache line increases the granularity at which memory devices can be spared, for example up to the contribution of a single memory device to the cache line.

We claim:

1. A method for storing memory erasure information, the method comprising:
   identifying a memory location of a cache associated with an error in a cache line, wherein the memory location is in a first memory device of a plurality of memory devices on a memory module;
   writing, to one of the plurality of memory devices, a device number corresponding to the first memory device, wherein the device number indicates the memory location associated with the error; and
   retrieving from the one of the memory devices, the device number corresponding to the first memory device, wherein the cache line comprises data read from the memory location and a position of data in the cache line corresponds to the device number of the first memory device;
   determining, based on the retrieved device number, a position, in the cache line, of the data read from the identified memory location; and
   correcting the data in the determined position.

2. The method of claim 1, further comprising writing, to another one of the plurality of memory devices, a copy of the device number corresponding to the first memory device.

3. The method of claim 1, further comprising embedding tag encoding bits in the device number.

4. The method of claim 1, further comprising:
   scrubbing the identified memory location in the first memory device; and
   reading data from the scrubbed memory location, wherein the device number corresponding to the first memory device is written to the one of the plurality of memory devices if the data read from the scrubbed memory location is erroneous.

5. The method of claim 1, further comprising:
   designating a region around the memory location as defective; and
   retrieving, when an address in the designated region is read, the device number corresponding to the first memory device.

6. A non-transitory machine-readable storage medium encoded with instructions executable by a processor of a memory controller for storing memory erasure information, the instructions to cause the processor to perform the steps of:
   identifying a memory location associated with an error in a cache line, wherein the cache line comprises data read from the memory location, and wherein the memory location is in a first memory device of a plurality of memory devices on a memory module;
   storing, in one of the plurality of memory devices, a device number corresponding to the first memory device, wherein the device number indicates the memory location associated with the error;
   retrieving, from the one of the memory devices, the device number corresponding to the first memory device, wherein the cache line comprises data read from the memory location and a position of data in the cache line corresponds to the device number of the first memory device; and
   determining, based on the device number, a position of an error in the cache line.

7. The non-transitory machine-readable storage medium of claim 6, further comprising instructions to cause the processor to perform the steps of storing, in another one of the plurality of memory devices, the device number corresponding to the first memory device.

8. The non-transitory machine-readable storage medium of claim 7, further comprising instructions to cause the processor to perform the steps of embedding tag encoding bits in the device number.

9. The non-transitory machine-readable storage medium of claim 8, further comprising instructions to cause the processor to perform the steps of:
designating a region around the memory location as defective; and
retrieving, when an address in the designated region is read, the device number corresponding to the first memory device.

10. A non-transitory machine-readable storage medium encoded with instructions executable by a processor of a memory controller for correcting cache line errors, the instructions to cause the processor to perform the steps of:
detecting an error in a cache line, wherein the detected error is associated with a first memory device of a plurality of memory devices of a memory module;
reading, from the cache line, a first device number, wherein the position of data in the cache line corresponds to the first device number of the first memory device;
determining, based on the first device number, a position of the detected error in the cache line; and
correcting the detected error.

11. The non-transitory machine-readable storage medium of claim 10, further comprising instructions to cause the processor to perform the steps of identifying, in the cache line, a second device number, wherein the second device number is read from another one of the plurality of memory devices.

12. The non-transitory machine-readable storage medium of claim 11, further comprising instructions to cause the processor to perform the steps of:
comparing the first device number and the second device number;
determining if the first device number and the second device number do not match, and if the detected error is not successfully corrected when the first device number is used to determine the position of the detected error, the position of the detected error in the cache line, based on the second device number.

13. The non-transitory machine-readable storage medium of claim 11, wherein tag encoding bits are embedded in the first device number.

14. The non-transitory machine-readable storage medium of claim 12, further comprising instructions to cause the processor to perform the steps of:
keeping track of how many errors are associated with a region of the first memory device; and
retrieving, when an address in the region is read, the device number corresponding to the first memory device.

* * * * *